(12) United States Patent
Kerstetter

(10) Patent No.: US 9,279,289 B2
(45) Date of Patent: Mar. 8, 2016

(54) COMBINATION MUD MOTOR FLOW DIVERTER AND TILED BEARING, AND BEARING ASSEMBLIES INCLUDING SAME

(71) Applicant: Renegade Manufacturing, LLC, Youngsville, LA (US)

(72) Inventor: Scott Kerstetter, Youngsville, LA (US)

(73) Assignee: RENEGADE MANUFACTURING, LLC, Youngsville, LA (US)

( * ) Notice: Subject to any disclaimer, the term of this patent is extended or adjusted under 35 U.S.C. 154(b) by 14 days.

(21) Appl. No.: 14/494,421

(22) Filed: Sep. 23, 2014

(65) Prior Publication Data

US 2015/0096809 A1 Apr. 9, 2015

Related U.S. Application Data

(60) Provisional application No. 61/886,347, filed on Oct. 3, 2013.

(51) Int. Cl.
*E21B 4/02* (2006.01)
*E21B 4/00* (2006.01)

(52) U.S. Cl.
CPC ..................................... *E21B 4/003* (2013.01)

(58) Field of Classification Search
CPC ............... F16C 33/043; F16C 2206/40; F16C 2206/82; F16C 2206/06; F16C 2352/00; E21B 4/003; E21B 10/22
See application file for complete search history.

(56) References Cited

U.S. PATENT DOCUMENTS

| | | |
|---|---|---|
| 2,170,054 A | 8/1939 | Jeschor |
| 2,206,922 A | 7/1940 | Smith |
| 2,286,528 A | 6/1942 | Yost |
| 2,304,198 A | 12/1942 | Overstrom et al. |
| 2,307,326 A | 1/1943 | Lissauer |
| 2,314,703 A | 3/1943 | Howarth |
| 2,320,927 A | 6/1943 | Hagg |
| 2,348,046 A | 5/1944 | Yost |
| 2,441,294 A | 5/1948 | Shafer |
| 2,452,352 A | 10/1948 | Booth |
| 3,659,662 A | 5/1972 | Dicky |
| 3,703,014 A | 11/1972 | Koester |
| 3,728,752 A | 4/1973 | Andra et al. |
| 3,782,788 A | 1/1974 | Koester et al. |
| 3,855,524 A | 12/1974 | Crawford |
| 3,862,762 A | 1/1975 | Millsap |
| 4,083,612 A | 4/1978 | Olson |
| 4,097,094 A | 6/1978 | Gardner |
| 4,103,979 A | 8/1978 | Kuhn |
| 4,111,498 A | 9/1978 | Miller |
| 4,114,704 A | 9/1978 | Maurer et al. |

(Continued)

*Primary Examiner* — Thomas R. Hannon
(74) *Attorney, Agent, or Firm* — Jeffrey L. Wendt; The Wendt Firm, P.C.

(57) ABSTRACT

A mud motor radial bearing, a combination flow diverter and integral radial mud motor bearing, and a mud motor bearing assembly including the combination. The flow diverter includes a body defining threaded box ends, a concentric longitudinal bore, a generally cylindrical outer surface, and a longitudinal axis. The longitudinal bore fluidly connects the first and second threaded box ends. The first threaded box end connects to a pin of a transmission of a mud motor rotor, and the second threaded box end connects to a pin of a mandrel. A portion of the generally cylindrical outer surface of the body in a region of the second threaded box end has bonded thereto a bearing material. The bearing material includes a plurality of tungsten carbide portions surrounded by a hard metal alloy matrix binder.

20 Claims, 5 Drawing Sheets

(56) References Cited

U.S. PATENT DOCUMENTS

| | | | |
|---|---|---|---|
| 4,190,300 | A | 2/1980 | Scalzi |
| 4,225,000 | A | 9/1980 | Maurer et al. |
| 4,246,976 | A | 1/1981 | McDonald, Jr. |
| 4,286,828 | A | 9/1981 | Sides et al. |
| 4,324,299 | A | 4/1982 | Nagel |
| 4,340,334 | A | 7/1982 | Nixon |
| 4,346,591 | A | 8/1982 | Evans |
| 4,361,194 | A | 11/1982 | Chow et al. |
| 4,410,054 | A | 10/1983 | Nagel et al. |
| 4,460,134 | A | 7/1984 | Kunz |
| 4,490,054 | A | 12/1984 | Kimmelaar |
| 4,497,587 | A | 2/1985 | Pine |
| 4,560,014 | A * | 12/1985 | Geczy .................... E21B 4/003 175/107 |
| 4,560,213 | A | 12/1985 | Enderle et al. |
| 4,577,704 | A | 3/1986 | Aumann |
| 4,593,774 | A | 6/1986 | Lingafelter |
| 4,597,676 | A | 7/1986 | Vohr et al. |
| 4,620,601 | A | 11/1986 | Nagel |
| 4,738,550 | A | 4/1988 | Gardner |
| 4,756,631 | A * | 7/1988 | Jones .................... E21B 10/22 175/359 |
| 4,810,105 | A | 3/1989 | Arlott et al. |
| 4,864,231 | A | 9/1989 | Okumura et al. |
| 4,928,339 | A | 5/1990 | Klawe |
| 4,961,652 | A | 10/1990 | Nallenweg et al. |
| 5,007,745 | A | 4/1991 | Ball et al. |
| 5,037,212 | A | 8/1991 | Justman et al. |
| 5,048,981 | A | 9/1991 | Ide |
| 5,068,965 | A | 12/1991 | Ball et al. |
| 5,102,238 | A | 4/1992 | Contzen |
| 5,248,204 | A | 9/1993 | Livingston et al. |
| 5,255,984 | A | 10/1993 | Ide |
| 5,271,676 | A | 12/1993 | Keck et al. |
| 5,288,153 | A | 2/1994 | Gardner |
| 5,292,229 | A | 3/1994 | Kling et al. |
| 5,337,840 | A | 8/1994 | Chancey et al. |
| 5,374,129 | A | 12/1994 | Vohr et al. |
| 5,393,145 | A | 2/1995 | Ide |
| 5,423,613 | A | 6/1995 | Keck et al. |
| 5,455,778 | A | 10/1995 | Ide et al. |
| 5,459,674 | A | 10/1995 | Ide et al. |
| 5,482,380 | A | 1/1996 | Corratti et al. |
| 5,489,155 | A | 2/1996 | Ide |
| 5,498,081 | A | 3/1996 | Dennis et al. |
| 5,513,917 | A | 5/1996 | Ide et al. |
| 5,531,523 | A | 7/1996 | Subbiah |
| 5,611,292 | A | 3/1997 | Clark et al. |
| 5,618,116 | A | 4/1997 | Ishikawa |
| 5,620,260 | A | 4/1997 | Ide |
| 5,720,558 | A | 2/1998 | Edney et al. |
| 5,732,811 | A | 3/1998 | Gratson et al. |
| 5,738,445 | A | 4/1998 | Gardner |
| 5,743,654 | A | 4/1998 | Ide et al. |
| 5,772,334 | A | 6/1998 | Parkins et al. |
| 5,804,536 | A | 9/1998 | Asao et al. |
| 5,836,701 | A | 11/1998 | Vranish |
| 5,905,923 | A | 5/1999 | Chitsaz et al. |
| 5,911,511 | A | 6/1999 | Saville |
| 5,956,995 | A | 9/1999 | Herben et al. |
| 6,109,790 | A | 8/2000 | von Gynz-Rekowski et al. |
| 6,416,225 | B1 | 7/2002 | Cioceanu et al. |
| 6,550,441 | B1 | 4/2003 | Drangel et al. |
| 6,578,880 | B2 | 6/2003 | Watts |
| 6,736,542 | B2 | 5/2004 | Hudson |
| 6,766,697 | B1 | 7/2004 | Perez et al. |
| 7,237,957 | B2 | 7/2007 | Geiger |
| 7,387,442 | B2 | 6/2008 | Spikes |
| 7,420,721 | B2 | 9/2008 | Takeuchi |
| 7,475,917 | B2 | 1/2009 | Sivley, IV et al. |
| 7,476,063 | B2 | 1/2009 | Wickman et al. |
| 7,497,628 | B2 | 3/2009 | Shepherd |
| 7,500,787 | B2 | 3/2009 | Cioceanu |
| 7,625,121 | B2 | 12/2009 | Pettinato et al. |
| 7,758,247 | B2 | 7/2010 | Geiger |
| 7,836,601 | B2 | 11/2010 | El-Shafei |
| 7,845,645 | B1 | 12/2010 | Chu et al. |
| 7,882,638 | B2 | 2/2011 | von Gynz-Rekowski |
| 7,942,213 | B2 | 5/2011 | Sihler |
| 8,007,581 | B2 | 8/2011 | Scott et al. |
| 8,025,110 | B2 | 9/2011 | Falgout, Jr. et al. |
| D661,713 | S | 6/2012 | Marchesan |
| 8,210,747 | B2 * | 7/2012 | Cooley .................... E21B 4/003 384/282 |
| 8,285,411 | B2 | 10/2012 | Hull et al. |
| 8,511,906 | B2 | 8/2013 | Marchand |
| 8,646,981 | B2 | 2/2014 | Peterson et al. |
| 8,651,743 | B2 | 2/2014 | Peterson et al. |
| 8,721,185 | B2 | 5/2014 | Marchesan |
| 8,726,503 | B2 | 5/2014 | Pettinato et al. |
| 8,795,794 | B2 | 8/2014 | Dezert et al. |
| 8,814,434 | B1 * | 8/2014 | Sexton .......................... 384/282 |
| 2003/0116887 | A1 | 6/2003 | Scott |
| 2004/0032996 | A1 | 2/2004 | Hudson |
| 2005/0105835 | A1 | 5/2005 | Spikes |
| 2005/0275300 | A1 | 12/2005 | El-Shafei |
| 2006/0193543 | A1 | 8/2006 | Geiger |
| 2006/0239596 | A1 | 10/2006 | Shephard |
| 2006/0283017 | A1 | 12/2006 | von Gynz-Rekowski |
| 2007/0248293 | A1 | 10/2007 | Pettinato et al. |
| 2007/0269157 | A1 | 11/2007 | Fahrni et al. |
| 2008/0003061 | A1 | 1/2008 | Imiolek et al. |
| 2008/0013872 | A1 | 1/2008 | Geiger |
| 2008/0029304 | A1 | 2/2008 | LeBlanc et al. |
| 2008/0099246 | A1 | 5/2008 | Sihler |
| 2008/0190669 | A1 | 8/2008 | Cioceanu |
| 2008/0224556 | A1 | 9/2008 | El-Shafei |
| 2009/0196541 | A1 | 8/2009 | Johnson |
| 2010/0037462 | A1 | 2/2010 | Pettinato et al. |
| 2010/0127429 | A1 | 5/2010 | Scott et al. |
| 2010/0288559 | A1 | 11/2010 | Dezert et al. |
| 2012/0177308 | A1 | 7/2012 | Marchand |
| 2012/0195542 | A1 | 8/2012 | Marchand |
| 2012/0272516 | A1 | 11/2012 | Marchesan |
| 2012/0281938 | A1 | 11/2012 | Peterson et al. |
| 2013/0004105 | A1 | 1/2013 | Wenzel |
| 2013/0051716 | A1 | 2/2013 | Cioceanu |
| 2013/0182980 | A1 | 7/2013 | Peterson et al. |
| 2013/0182982 | A1 * | 7/2013 | Dennis ................ F16C 33/043 384/456 |
| 2014/0102810 | A1 | 4/2014 | Peterson et al. |
| 2014/0105739 | A1 | 4/2014 | Peterson et al. |
| 2014/0307991 | A1 | 10/2014 | Dezert et al. |

* cited by examiner

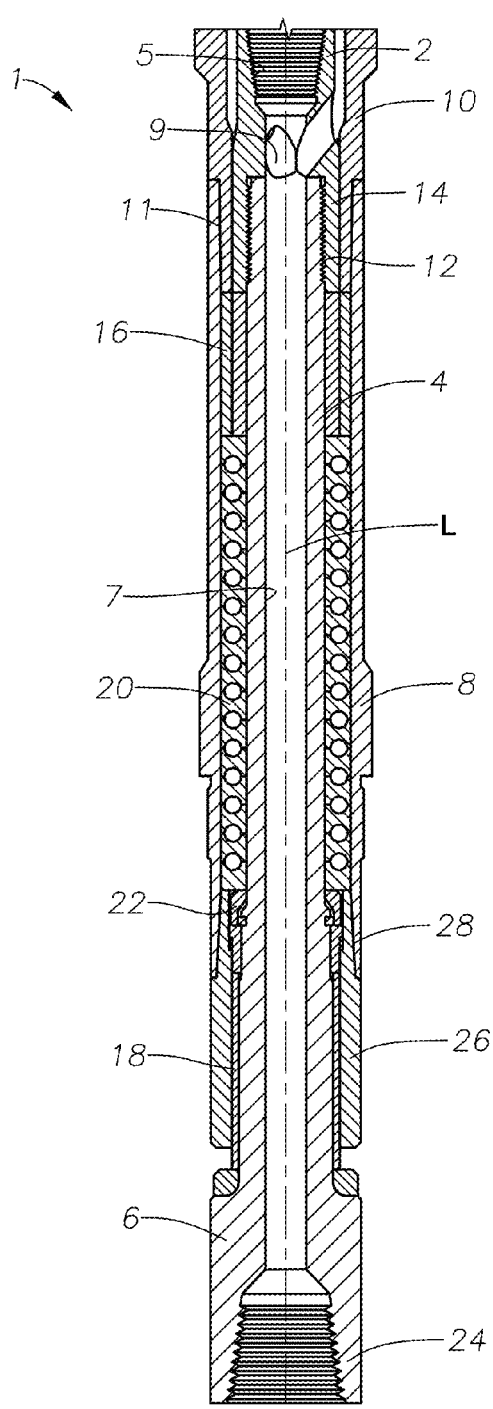
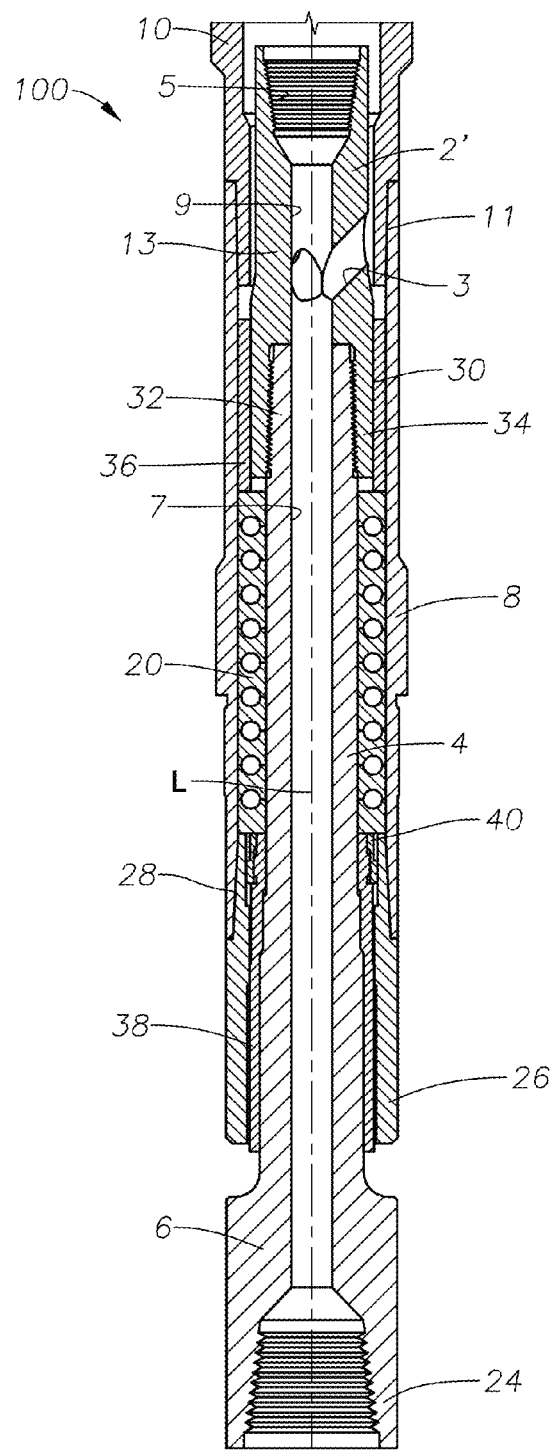
FIG. 1
(Prior Art)
FIG. 2

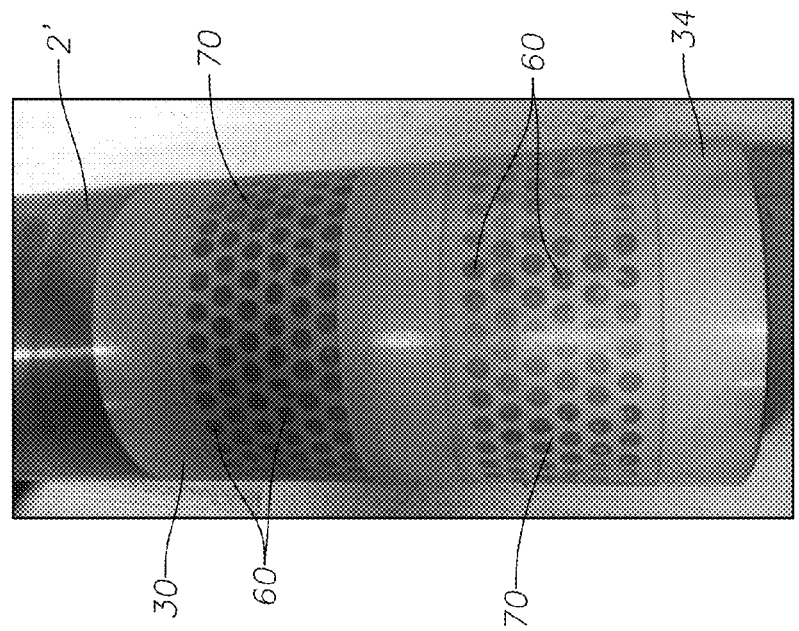
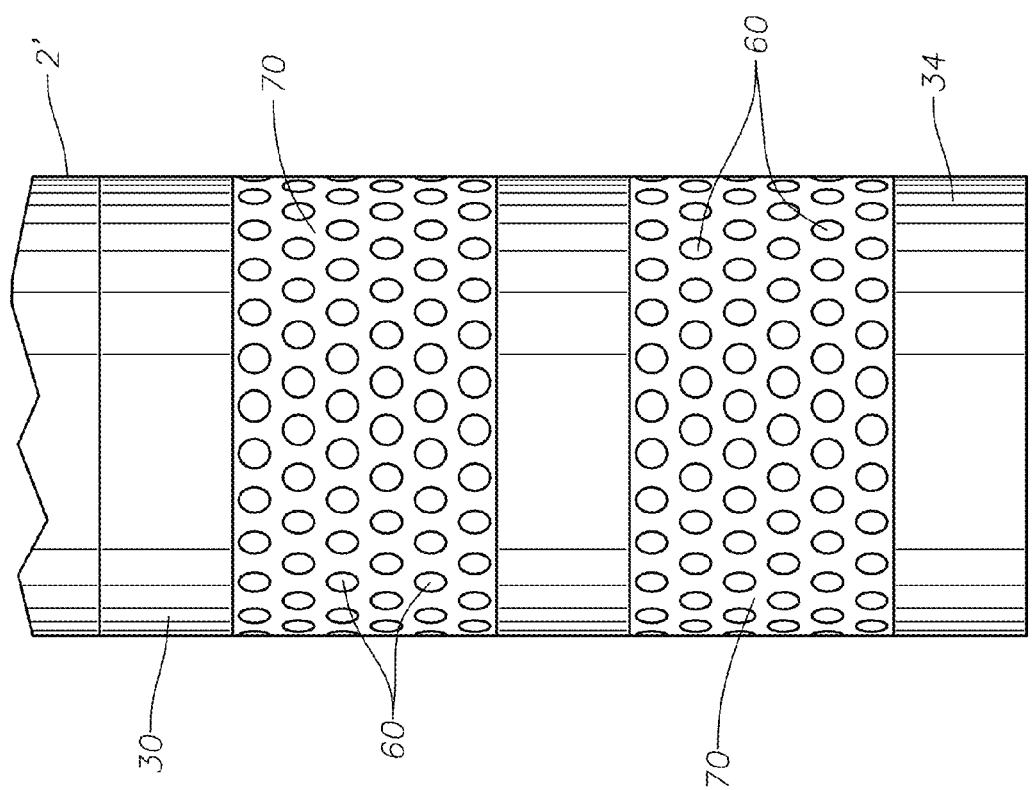
FIG. 4A
FIG. 4

COMBINATION MUD MOTOR FLOW DIVERTER AND TILED BEARING, AND BEARING ASSEMBLIES INCLUDING SAME

BACKGROUND INFORMATION

1. Technical Field

The present disclosure relates generally to the field of pump bearings, and more particularly to bearing assemblies in down hole mud motors.

2. Background Art

Down hole mud motors are used within the oil and natural gas industry for earth boring operations. In some prior arrangements, such as the arrangement generally designated 1 as illustrated in FIG. 1, a mandrel 4 connects a drill bit through an output or drive shaft 6 and bit box 24 to a flow diverter 2 (also sometimes called a flow restrictor), the flow diverter 2 in turn connected to the rotor of the mud motor through a transmission via an upper box 5, (the transmission, drill bit and mud motor are not illustrated). In the arrangement illustrated in FIG. 1, a straight, non-tapered threaded pin 12 of mandrel 4 connects mandrel 4 to a lower flow diverter box end 14 through a straight stub acme pin. The mandrel stub acme pin, despite its rugged construction, often experiences cracks and other damage, which is undesirable. Also illustrated are an upper bearing housing 8 threadedly connected to a lower bearing housing 26 at threaded connection 28; a mud motor housing 10 threadedly connected at 11 to upper bearing housing 8; upper and lower radial bearings 16 and 18 (typically roller, ball bearing, or marine type); a thrust bearing stack 20; and a mandrel catch 22. Also illustrated are central bores 7 and 9 of the mandrel 4 and flow diverter 2, respectively, generally centered along a longitudinal axis L.

The bearings of mud motors (thrust and radial) are subjected to extreme conditions. In certain arrangements, as detailed in FIG. 1, mud motor bearing assemblies may be lubricated by drilling mud or other drilling fluid, or by dedicated oil lubricant sealed off from the drilling fluid. It would be advantageous to improve the wear resistance of bearings in mud or drilling fluid-lubricated arrangements.

U.S. Pat. No. 5,037,212 discloses thrust bearings employing a rotatable support ring fixedly attached to the drive shaft of a downhole motor. The support ring includes a plurality of diamond inserts closely spaced around the ring. The assembly further includes a stationary support ring fixedly attached to the housing of the motor. The stationary ring includes a plurality of diamond inserts spaced relatively further apart on the ring to allow cooling fluid to pass therethrough. The stationary ring is made of tungsten carbide. The '212 patent illustrates a tapered threaded connection between the mandrel and flow diverter, and a marine radial bearing integral with the flow diverter.

U.S. Pat. No. 6,416,225 discloses a mud motor bearing including at least three radial bearings to protect the flow restrictor of the bearing assembly against harmful sideways and lateral loading. U.S. Pat. No. 7,500,787, discussing the '225 patent, states that the flow restrictor is usually quite brittle, and a radial bearing is typically provided above and below the flow restrictor to protect against bending forces, necessitating two lubricated bearing chambers, where the upper bearing chamber must accommodate passages to allow drilling fluid flow between the mandrel and the housing in order to equalize pressure on either side of the upper bearing chamber. U.S. Pat. No. 6,416,225 discloses a bearing assembly having a radial bearing assembly above the flow restrictor, with a separate sealed bearing chamber from the main sealed bearing chamber. The '787 patent notes that the mandrel is also susceptible to damage by drilling loads, as well as by the severe shock and vibration incurred during drilling applications. U.S. Pat. No. 8,025,110 discloses a down hole drilling motor shaft security apparatus.

Replacement of mud motor bearings, mandrels, or components thereof are all costly operations and thus to be avoided if at all possible. The present disclosure addresses one or more of these problems.

SUMMARY

In accordance with the present disclosure, a mud motor radial bearing, a combination flow diverter and integral radial mud motor bearing, and a mud motor bearing assembly including the combination are presented which may increase life of such bearings and assemblies.

A mud motor radial bearing of this disclosure comprises:

a rotatable cylindrical steel support having a generally cylindrical outer surface, at least portions of the outer surface having bonded thereto a bearing material, the bearing material comprising a plurality of tungsten carbide portions surrounded by a hard metal alloy matrix, the hard metal alloy matrix comprising at least one carbide selected from carbides of chrome, carbides of boron, and mixtures thereof, the remainder of the hard metal alloy matrix comprising a binder metal selected from iron, cobalt, nickel, and mixtures thereof; and a portion of a stationary cylindrical bearing housing having a generally cylindrical inner surface against which an outer surface of the bearing material interfaces as the rotatable cylindrical steel support rotates.

Another aspect of the disclosure is a combination flow diverter and integral radial mud motor bearing comprising:

a generally cylindrical flow diverter body defining first and second threaded box ends, a concentric longitudinal bore, a generally cylindrical outer surface, and a longitudinal axis;

the longitudinal bore fluidly connecting first and second threaded box end bores, the first threaded box end bore configured to threadedly connect to a pin of a transmission of a mud motor, the second threaded box end bore configured to threadedly connect to a pin of a mandrel;

one or more flow diverter ports extending from the longitudinal bore to the outer surface of the body, fluidly connecting the longitudinal bore with an annulus between the outer surface and a mud motor housing and configured to route fluid from the annulus into the concentric longitudinal bore; and the generally cylindrical outer surface of the body in a region of the second threaded box end having bonded thereto a bearing material, the bearing material comprising a plurality of tungsten carbide portions surrounded by a hard metal alloy matrix, the hard metal alloy matrix comprising at least one carbide selected from carbides of chrome, carbides of boron, and mixtures thereof, the remainder of the hard metal alloy matrix comprising a binder metal selected from iron, cobalt, nickel, and mixtures thereof.

Another aspect of this disclosure is a mud motor bearing assembly comprising:

a generally cylindrical housing;

the combination flow diverter and integral radial mud motor bearing of this disclosure positioned within the housing;

a generally cylindrical mandrel having a pin end fluidly connected to the second threaded box end of the flow diverter, and a box end configured to fluidly attach to a drill bit;

a lower radial bearing comprising a heat shrink-fitted sleeve heat-shrunk onto a first portion of an outer surface of the mandrel; and one or more thrust bearings positioned in an annular space generally defined by a first portion of an inner surface of the housing, a second portion of the outer surface of the mandrel, the second box end of the flow diverter, and the lower radial bearing.

In another mud motor bearing assembly embodiment, the lower radial bearing is not heat-shrunk onto the mandrel but threadedly connected to the mandrel, and a safety nut is screwed onto the top of the lower radial bearing, acting as a safety mechanism, ensuring the mandrel is not lost if a break occurs above the safety nut.

BRIEF DESCRIPTION OF THE DRAWINGS

The manner in which the objectives of the disclosure and other desirable characteristics can be obtained is explained in the following description and attached schematic drawings in which:

FIG. 1 is a cross-sectional view of a prior art mud motor bearing assembly and flow diverter;

FIG. 2 is a cross-sectional view of one embodiment of a bearing assembly in accordance with the present disclosure;

FIG. 4 is a side elevation view and FIG. 4A is a photograph of a portion of the radial bearing used in FIGS. 2 and 3.

It is to be noted, however, that the appended drawings are schematic only, may not be to scale, illustrate only typical embodiments of this disclosure, and are therefore not to be considered limiting of its scope, for the disclosure may admit to other equally effective embodiments.

DETAILED DESCRIPTION

In the following description, numerous details are set forth to provide an understanding of the disclosed apparatus and methods. However, it will be understood by those skilled in the art that the apparatus and methods covered by the claims may be practiced without these details and that numerous variations or modifications from the specifically described embodiments may be possible and are deemed within the claims. All U.S. published patent applications and U.S. Patents referenced herein are hereby explicitly incorporated herein by reference. In the event definitions of terms in the referenced patents and applications conflict with how those terms are defined in the present application, the definitions for those terms that are provided in the present application shall be deemed controlling. All percentages herein are based on weight unless otherwise specified.

Figure 3:
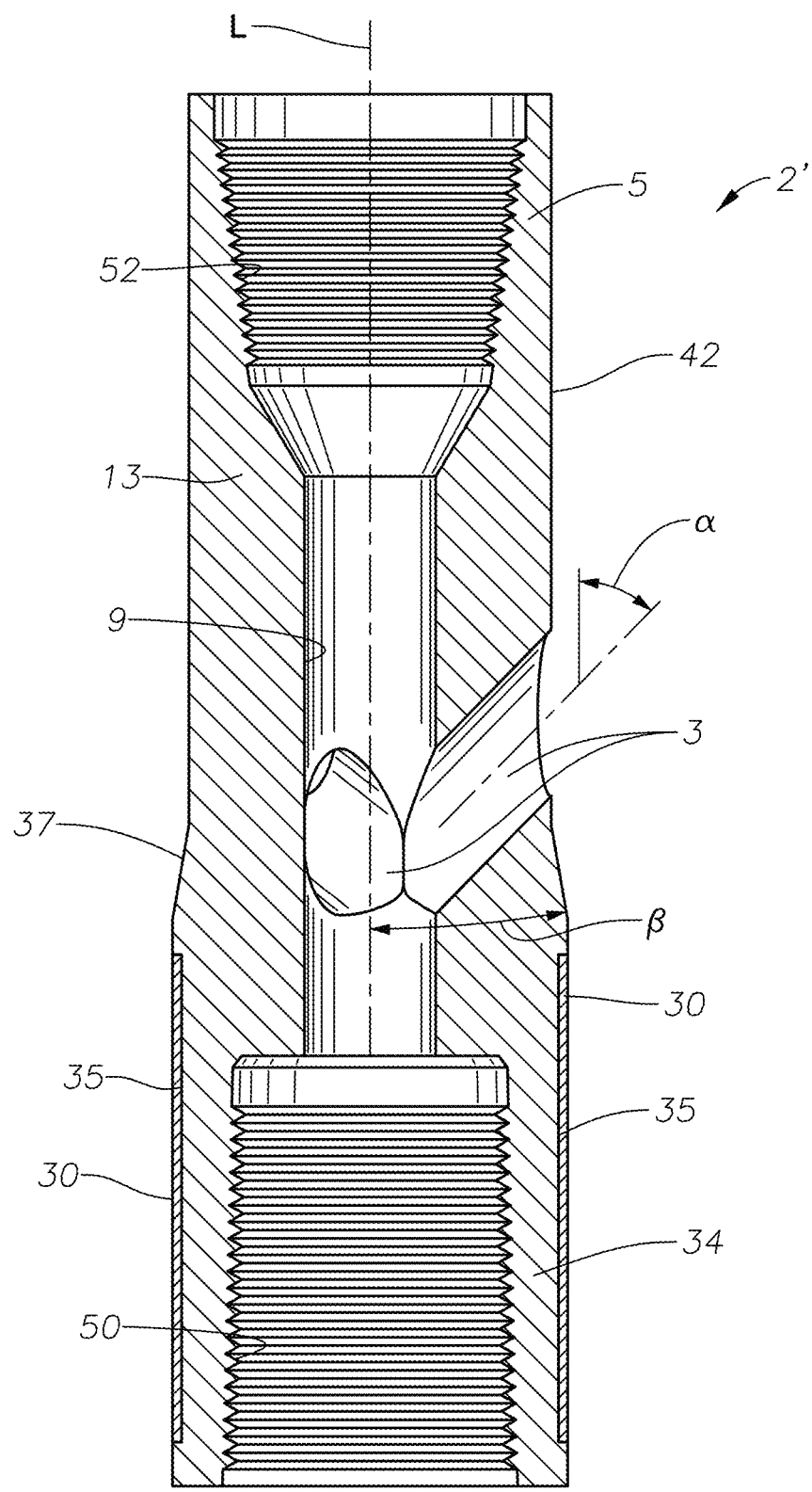
FIG. 3 is a more detailed cross-sectional view of the combination flow diverter and radial bearing of FIG. 2.

FIG. 2 is a cross-sectional view of one bearing assembly embodiment 100 of the present disclosure, and FIG. 3 is a more detailed cross-section view of a portion the bearing assembly embodiment of FIG. 2. Bearing assembly embodiment 100 includes a mandrel 4 connecting a drill bit through an output or drive shaft 6 to a combination flow diverter 2', the combination flow diverter 2' in turn connected to the rotor of the mud motor through a transmission via an upper box 5, (the transmission, drill bit and mud motor are not illustrated). In contrast to the bearing assembly of FIG. 1, combination flow diverter 2' illustrated in FIG. 2 includes a tapered threaded pin 32 of mandrel 4 connecting mandrel 4 to a mating tapered threaded lower flow diverter box end 34. In contrast to stub acme pins used in the prior art, which despite their rugged construction often crack or experience other damage, which is undesirable, the tapered threaded connection has not. Also illustrated are an upper bearing housing 8 threadedly connected to a lower bearing housing 26 at threaded connection 28; a mud motor housing 10 threadedly connected at 11 to upper bearing housing 8; a thrust bearing stack 20; and a box connector 24 to connect to the drill bit, these features being essentially unchanged from the prior art embodiment 1 illustrated in FIG. 1. Central bores 7 and 9 of mandrel 4 and flow diverter 2, respectively, and longitudinal axis "L" are also unchanged.

As mentioned above, bearing assembly embodiment 100 illustrated in FIG. 2 features a combination flow diverter 2' and integral radial mud motor bearing. Combination flow diverter 2', which is illustrated in greater detail in FIG. 3, includes a generally cylindrical flow diverter body 13 defining first (upper) and second (lower) threaded box ends 5 and 34 (upper box end 5 not being significantly changed), a concentric longitudinal bore 9, a generally cylindrical outer surface 42, and a longitudinal axis L. Longitudinal bore 9 fluidly connects first and second threaded box end bores 52, 50, the first threaded box end bore 52 configured to threadedly connect to a pin of a mud motor transmission, the transmission in turn connected to a mud motor rotor (the transmission and mud motor rotor are not shown), the second threaded box end bore 50 configured to threadedly connect to tapered threaded pin 32 of mandrel 4. One or more flow diverter ports 3 extend from longitudinal bore 9 to outer surface 42 of body 13, fluidly connecting longitudinal bore 9 with an annulus between outer surface 42 and mud motor housing 10, and configured to route fluid from that annulus into longitudinal bore 9. Generally cylindrical outer surface 42 of body 13 in a region of the second (lower) threaded box end 34 has bonded thereto a bearing material 30 comprising a plurality of tungsten carbide portions 60 (FIGS. 4 and 4A) surrounded by a hard metal alloy matrix 70. The hard metal alloy matrix 70 comprises at least one carbide selected from carbides of chrome, carbides of boron, and mixtures thereof, the remainder of the hard metal alloy matrix 70 comprising a binder metal selected from iron, cobalt, nickel, and mixtures thereof. It may thus be seen that combination flow diverter 2' is a combination flow diverter and integral radial mud motor bearing, wherein the second threaded box end bore is tapered, being smaller in diameter toward the longitudinal bore, the diameter increasing toward an exit of the second threaded box end bore.

In certain embodiments, the combination flow diverter 2' and integral radial mud motor bearing has the at least one carbide portion 60 present at a weight percentage of at least 30 weight percent, based on total weight of the at least one carbide and binder. The plurality of tungsten carbide portions 60 may be bonded to the generally cylindrical outer surface 42 of the second threaded box end 34 using a heating mechanism, such as tack welding, brazing, adhesive bonding, or other. In certain embodiments the plurality of tungsten carbide portions are solid cylindrical-shaped having an outer diameter (OD) ranging from about 0.100 inch up to about 0.500 inch (2.54 mm to 12.7 mm), and height ranging from about 0.03 inch up to about 0.25 inch (0.762 mm to 6.35 mm).

Referring again to FIG. 3, in certain embodiments the combination flow diverter 2' and integral radial mud motor bearing flow diverter ports 3 are each positioned at an angle "α" ranging from about 20 to about 70 degrees, or from about 25 to about 65 degrees, or from about 30 to about 60 degrees, the angle "α" measured from a line perpendicular to the longitudinal axis "L" to a line through a longitudinal axis of port 3. In certain embodiments the combined flow diverter 2' has three ports arranged at 120 degree angles between them.

Referring again to FIG. 3, in certain embodiments the combination flow diverter 2' and integral radial mud motor bearing has an increasing diameter area 37 of the generally cylindrical outer surface 42 downstream of each port 3, the increasing diameter area 37 angled to the longitudinal axis "L" at an angle "β" ranging from about 10 to about 15 degrees, or from about 11 to about 14 degrees.

Referring again to FIG. 3, in certain embodiments the combination flow diverter 2' and integral radial mud motor bearing has a cut-out area 35 of reduced diameter where radial bearing material 30 is positioned so as to be flush with the balance of outer surface 42.

The bearing assemblies of the present disclosure exhibit increased life or decreased breakdown compared with those of FIG. 1 and similar bearing assemblies.

As best viewed in FIGS. 4 and 4A, tungsten carbide buttons 60 may comprise a plurality of areas or regions, and buttons 60 make take any suitable arrangement, size, and position on the outer surface 42 of the second box connection 34 of the flow diverter.

In certain embodiments, tungsten carbide buttons 60 may be arranged in a pattern such as illustrated in FIG. 4 and shown in the photograph of FIG. 4A. The pattern of buttons 60 may be random or non-random. Buttons 60 may have a height (h) above the outer surface of matrix 70 of a few millimeters, but are generally flush with matrix 70. In certain embodiments the height (h) may be essentially 0, in other words the button may be essentially flush with matrix material 70. In general, buttons 60 may have any shape, number, and height that do not adversely affect the usable life of the bearings.

In certain embodiments of mud motor radial bearings of this disclosure, the at least one carbide in the matrix material 70 may be present at a weight percentage of at least 30 weight percent, or at least 35, or 40, or 45, or 50, or 55, or 60, or 65, or 70, or 75, or at least 80 weight percent, based on total weight of the at least one carbide and binder. More carbide will tend to increase wear resistance of bearing materials 30, but may also reduce toughness of material 30.

Referring again to FIG. 2, bearing assembly embodiment 100 includes a mandrel catch 40 integral with a heat shrink-fitted sleeve portion 38 of the lower radial bearing. Mandrel catch 40 may be any integral device that allows the mandrel to catch onto an inner shoulder of lower bearing housing 26 in case of a break of mandrel 4 or combination flow diverter 2' above the mandrel catch, and may simply be a large diameter hardened steel portion of sleeve 38.

Figure 5A:
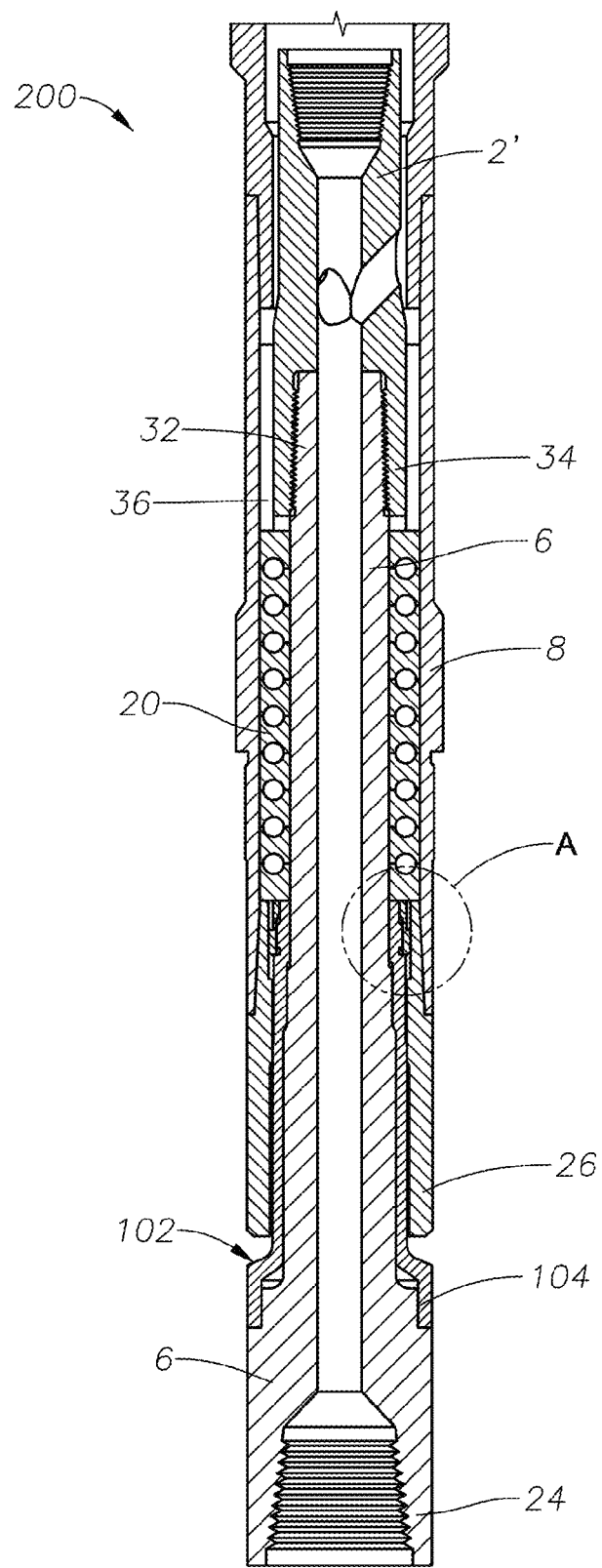
FIG. 5A is a cross-sectional view of another bearing assembly embodiment of the present disclosure, with FIG. 5B being more detailed cross-sectional view, and FIG. 5C being a perspective view of a portion bearing assembly embodiment of FIG. 5A.
Figure 5B:
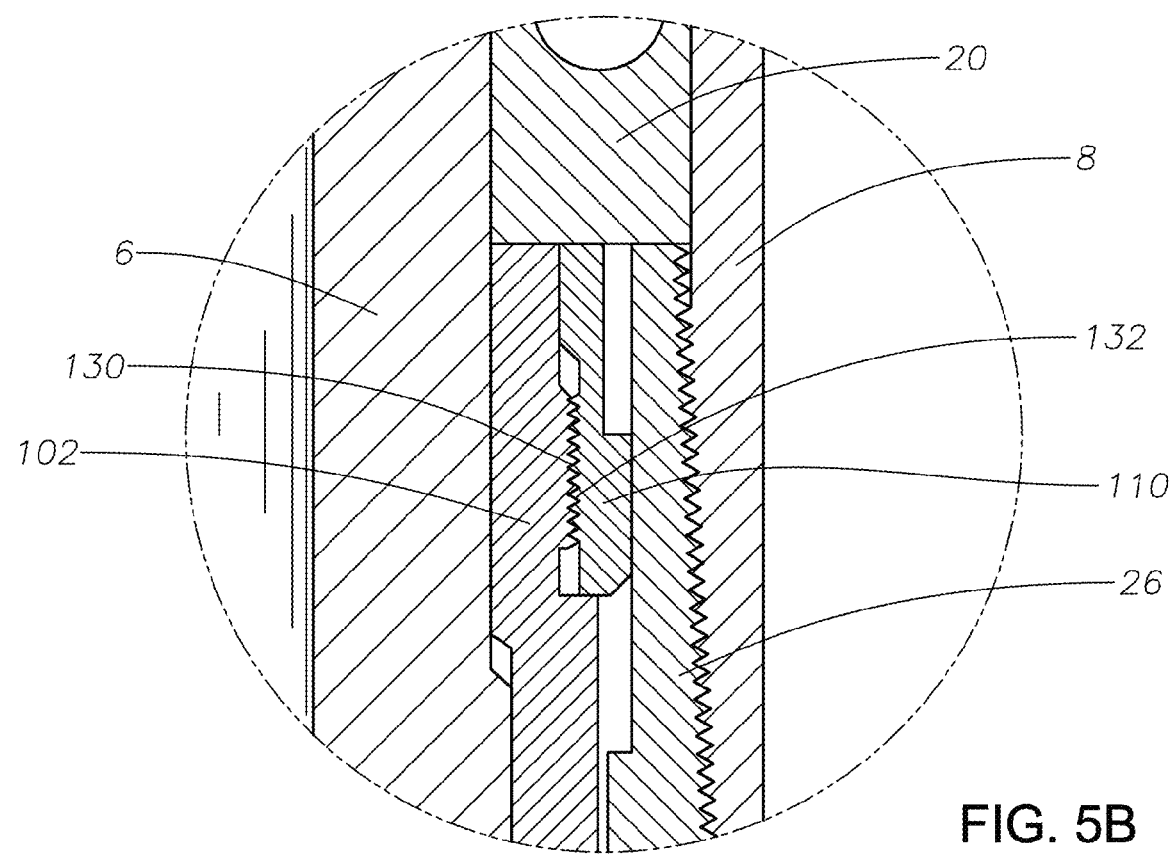
Figure 5C:
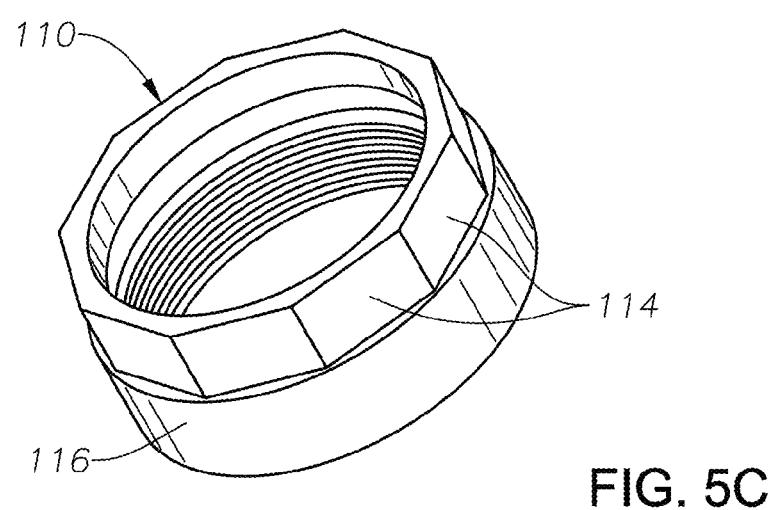

FIG. 5A is a cross-sectional view of another bearing assembly embodiment 200 of the present disclosure, and FIG. 5B is a more detailed cross-sectional view of a portion bearing assembly embodiment 200 of FIG. 5A. Embodiment 200 differs from embodiment 100 in that lower radial sleeve 102 screws onto mandrel 6 via threads 104 on the top of the bit box (bottom portion of mandrel 6), rather than being heat-shrink fit to mandrel 6. Lower bearing housing (otherwise known as an end nut) 26 is then slid over lower radial sleeve 102. Referring to FIGS. 5B and 5C, a safety nut 110 having wrench faces 114 and a slightly larger diameter lower portion 116 and is then screwed onto external threads 130 of lower radial sleeve 102, mating with internal threads 132 of nut 110. During operation, in case of a break in mandrel 4 above safety nut 110 or a break in combination flow diverter 2', the slightly larger diameter lower portion 116 of safety nut 110 interferes with an inner shoulder of lower bearing housing 26 and will not allow safety nut 110, lower radial sleeve 102, and mandrel 4 to be lost down hole. All the threads illustrated in FIGS. 5B and 5C are left hand.

Bearing assembly members, such as mandrels, sleeves, nuts, housing members, flow diverters, and associated components used in assemblies of the present disclosure may be comprised of metal, ceramic, ceramic-lined metal, or combination thereof. Suitable metals include carbon steels, stainless steels, for example, but not limited to, 41xx-43xx series aircraft quality steels, hardened versions of these, as well as titanium alloys, and the like.

Bearing assembly members, such as mandrels, sleeves, nuts, housing members, flow diverters, and associated components used in assemblies of the present disclosure, or portions thereof, may comprise the same or different corrosion resistant and/or fatigue resistant material, at least one of the corrosion and/or fatigue resistance being able to withstand the expected down hole service conditions experienced during a drilling or other operation. In certain embodiments, the bearing assembly members, such as mandrels, sleeves, housing members, flow diverters, and associated components used in assemblies of the present disclosure may comprise same or different noble metals or other exotic corrosion and/or fatigue-resistant materials, such as platinum (Pt), ruthenium (Ru), rhodium (Rh), palladium (Pd), silver (Ag), osmium (Os), iridium (Ir), and gold (Au); alloys of two or more noble metals; and alloys of one or more noble metals with a base metal.

The choice of a particular material is dictated among other parameters by the chemistry, pressure, and temperature of mud used and type of formation fluid(s) and other fluids, such as treatment fluids, to be encountered. The skilled artisan, having knowledge of the particular application, pressures, temperatures, and available materials, will be able design the most cost effective, safe, and operable bearing assembly members, such as mandrels, sleeves, housing members, flow diverters, and associated components used in assemblies of the present disclosure for each particular application without undue experimentation.

The terms "corrosion resistant" and "fatigue resistant" as used herein refer to two different failure mechanisms that may occur simultaneously, and it is theorized that these failure mechanisms may actually influence each other in profound ways. It is preferred that the bearing assembly members, such as mandrels, sleeves, flow diverters, housing members, and associated components used in assemblies of the present disclosure have a satisfactory service life of at least one month under conditions existing in a continuous operation, and it is especially preferred that they have a service life greater than 12 months.

Bearing assembly members, such as mandrels, sleeves, housing members, flow diverters, and associated components used in assemblies of the present disclosure may be made using a variety of processes, including molding, machining, net-shape cast (or near-net shape cast) using rapid prototype (RP) molds and like processes. Net-shape or near-net shape casting methods of making a variety of molds for producing a variety of complex products are summarized in patents assigned to 3D Systems, Inc., Rock Hill, S.C., U.S.A., for example U.S. Pat. No. 8,285,411.

Metal matrix materials useful as binders include hard metal alloys (available from companies such as Oryx Stainless). Hard metal alloys are composed mainly of (up to 95%) highly enameled, very hard carbides, either of one carbide type or of a carbide of varying types (W, Ti, Ta, Nb). Furthermore chrome or boron carbide as well as compounds of hard materials with nitrogen may be present. The remainder is binder phase, Fe, Co or Ni. Co is the most used. Whereas carbide increases the abrasion resistance and cutting property, the binder phase may maintain or increase toughness and bending strength. These alloys are produced through pulverization. Binding phase and hard materials are mixed to a powder. The powder is then pressed and sintered at temperatures higher than the melting point of the binding phase. The structure then has the appearance of rolled balls of carbide, with a binding phase filling. Durometer or Hardness Range of the matrix material may range from 20 to about 60 (Shore D, according to ASTM 2240).

In certain embodiments it has been found useful to employ tack welding to adhere the tungsten carbide buttons or regions onto the outer surface of the flow diverter. It is contemplated that an adhesive system, in certain embodiments with a primer, may be used. For example, it may be possible to first prime the outer surface of the flow diverter with a primer followed by an adhesive. Tack welding of tungsten carbide solid cylindrical-shaped buttons worked well in high flow rate down hole environments. Other attachment methods may be satisfactory depending on the service conditions.

Although only a few exemplary embodiments of this disclosure have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure as defined in the following claims. In the claims, no clauses are intended to be in the means-plus-function format allowed by 35 U.S.C. §112, Section F, unless "means for" is explicitly recited together with an associated function. "Means for" clauses are intended to cover the structures, materials, and acts described herein as performing the recited function and not only structural equivalents, but also equivalent structures.

What is claimed is:

1. A mud motor radial bearing comprising:
    a rotatable cylindrical steel support having a generally cylindrical outer surface, at least portions of the outer surface having bonded thereto a bearing material, the bearing material comprising a plurality of tungsten carbide portions surrounded by a hard metal alloy matrix, the hard metal alloy matrix comprising at least one carbide selected from carbides of chrome, carbides of boron, and mixtures thereof, the remainder of the hard metal alloy matrix comprising a binder metal selected from iron, cobalt, nickel, and mixtures thereof; and
    a portion of a stationary cylindrical bearing housing having a generally cylindrical inner surface against which an outer surface of the bearing material interfaces as the rotatable cylindrical steel support rotates.

2. The mud motor radial bearing according to claim 1 wherein the at least one carbide is present at a weight percentage of at least 30 weight percent, based on total weight of the at least one carbide and binder.

3. The mud motor radial bearing according to claim 1 wherein the generally cylindrical outer surface of the rotatable cylindrical steel support comprises a reduced diameter portion in which the bearing material is positioned so that the bearing material outer surface is flush with the balance of the generally cylindrical outer surface of the rotatable cylindrical steel support.

4. The mud motor radial bearing according to claim 1 wherein the rotatable cylindrical steel support is a portion of a rotatable member of a mud motor bearing assembly.

5. The mud motor radial bearing according to claim 4 wherein the rotatable member of the mud motor bearing assembly is a flow diverter, and the portion is a box connection of the flow diverter.

6. The mud motor radial bearing according to claim 1 wherein the plurality of tungsten carbide portions are bonded to the generally cylindrical outer surface of the rotatable cylindrical steel support using a heat attachment method.

7. The mud motor radial bearing according to claim 6 wherein the heat attachment method comprises tack welding.

8. The mud motor radial bearing according to claim 1 wherein the plurality of tungsten carbide portions are solid cylinder-shaped having an outer diameter (OD) ranging from about 0.100 inch up to about 0.500 inch (2.54 mm to 12.7 mm).

9. The mud motor radial bearing according to claim 1 wherein the plurality of tungsten carbide portions are solid cylinder-shaped having height ranging from about 0.03 inch up to about 0.25 inch (0.762 mm to 6.35 mm).

10. A combination flow diverter and integral radial mud motor bearing comprising:
    a generally cylindrical flow diverter body defining first and second threaded box ends, a concentric longitudinal bore, a generally cylindrical outer surface, and a longitudinal axis;
    the longitudinal bore fluidly connecting first and second threaded box end bores, the first threaded box end bore configured to threadedly connect to a pin of a transmission of a mud motor rotor, the second threaded box end bore configured to threadedly connect to a pin of a mandrel;
    one or more flow diverter ports extending from the longitudinal bore to the outer surface of the body, fluidly connecting the longitudinal bore with an annulus between the outer surface and a mud motor housing and configured to route fluid from the annulus into the concentric longitudinal bore; and
    the generally cylindrical outer surface of the body in a region of the second threaded box end having bonded thereto a bearing material, the bearing material comprising a plurality of tungsten carbide portions surrounded by a hard metal alloy matrix, the hard metal alloy matrix comprising at least one carbide selected from carbides of chrome, carbides of boron, and mixtures thereof, the remainder of the hard metal alloy matrix comprising a binder metal selected from iron, cobalt, nickel, and mixtures thereof.

11. The combination flow diverter and integral radial mud motor bearing of claim 10 wherein the second threaded box end bore is tapered, being smaller in diameter toward the longitudinal bore, the diameter increasing toward an exit of the second threaded box end bore.

12. The combination flow diverter and integral radial mud motor bearing of claim 10 wherein the at least one carbide is present at a weight percentage of at least 30 weight percent, based on total weight of the at least one carbide and binder.

13. The combination flow diverter and integral radial mud motor bearing of claim 10 wherein the plurality of tungsten carbide portions are bonded to the generally cylindrical outer surface of the second threaded box end using an adhesive system.

14. The combination flow diverter and integral radial mud motor bearing of claim 10 wherein the plurality of tungsten carbide portions are solid cylindrical-shaped having an outer diameter (OD) ranging from about 0.100 inch up to about 0.500 inch (2.54 mm to 12.7 mm), and having height ranging from about 0.03 inch up to about 0.25 inch (0.762 mm to 6.35 mm).

15. The combination flow diverter and integral radial mud motor bearing of claim 10 wherein the flow diverter ports are each positioned at an angle ranging from about 20 to about 70 degrees, the angle measured from a line perpendicular to the longitudinal axis to a line through a longitudinal axis of the port.

16. A mud motor bearing assembly comprising:
a generally cylindrical housing;
the combination flow diverter and integral radial mud motor bearing of claim 10 positioned within the housing;
a generally cylindrical mandrel having a pin end fluidly connected to the second threaded box end of the flow diverter, and a box end configured to fluidly attach to a drill bit;
a lower radial bearing comprising a heat shrink-fitted sleeve heat-shrunk onto a first portion of an outer surface of the mandrel; and
one or more thrust bearings positioned in an annular space generally defined by a first portion of an inner surface of the housing, a second portion of the outer surface of the mandrel, the second box end of the flow diverter, and the lower radial bearing.

17. The mud motor bearing assembly of claim 16 wherein the tungsten carbide portions may be the same or different in size, shape, and position from region to region, and the tungsten carbide portions may have the same or different composition from region to region.

18. The mud motor bearing assembly of claim 16 further comprising a mandrel catch integral with the heat shrink-fitted sleeve.

19. The mud motor bearing assembly of claim 16 wherein the flow diverter has three ports arranged at 120 degree angles between them.

20. A mud motor bearing assembly comprising:
a generally cylindrical housing;
the combination flow diverter and integral radial mud motor bearing of claim 10 positioned within the housing;
a generally cylindrical mandrel having a pin end fluidly connected to the second threaded box end of the flow diverter, and a box end configured to fluidly attach to a drill bit;
a lower radial bearing comprising a sleeve threadedly connected to a first portion of an outer surface of the mandrel;
a mandrel catch comprising a safety nut threadedly connected to the sleeve, the safety nut having a lower portion capable of interfering with an inner shoulder of the generally cylindrical housing; and
one or more thrust bearings positioned in an annular space generally defined by a first portion of an inner surface of the housing, a second portion of the outer surface of the mandrel, the second box end of the flow diverter, and the lower radial bearing.

* * * * *